United States Patent Office 3,468,890
Patented Sept. 23, 1969

3,468,890
PYRAZINO[1',2':1,2]PYRIDO[3,4-b]INDOLES
Sydney Archer, Bethlehem, N.Y., assignor to Sterling Drug Inc., New York, N.Y., a corporation of Delaware
No Drawing. Filed June 9, 1966, Ser. No. 556,275
Int. Cl. C07d 57/22; A61k 25/00
U.S. Cl. 260—268    3 Claims

ABSTRACT OF THE DISCLOSURE

Certain 1,3 - dioxo - 1,3,4,6,7,12b-hexahydro-2H,12H-pyrazino[1',2':1,2]pyrido[3,4-b]indoles which decrease spontaneous activity in mice are prepared by the interaction of the appropriate 1,2,3,4-tetrahydro-9H-pyrido[3,4-b]indole-1-carboxylic acid and an isocyanide in the presence of an aldehyde or ketone.

---

This invention relates to new and useful chemical compounds and to a process for preparing the same.

The compounds of the instant invention are 2-(R)-4 - ($R^1,R^2$)-6-($R^3$)-12b-($R^4$)-1,3 - dioxo - 1,3,4,6,7,12b-hexahydro - 2H,12H-pyrazino[1',2':1,2]pyrido[3,4-b]indoles having in free base form the structural formula

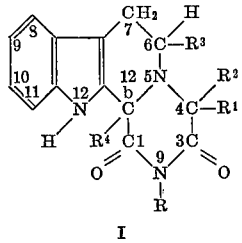

I wherein R represents lower-alkyl, cycloalkyl, cycloalkyl-lower-alkyl, phenyl, or phenyl-lower-alkyl, and $R^1$, $R^2$, $R^3$ and $R^4$ represent hydrogen, lower-alkyl, cycloalkyl, cycloalkyl-lower-alkyl, phenyl, or phenyl-lower-alkyl.

Moreover, the benzenoid moiety fused to the pyrrole ring can be further substituted in any of the positions available for substitution by substituents of a non-critical nature for purposes of synthesis, such as would occur to the man skilled in organic chemistry. There can be from one to four such substituents which can be the same or different and which can be in any position relative to each other, and without limiting the generality of the foregoing, examples are lower-alkyl, lower-alkoxy, phenyl-lower-alkoxy, methylenedioxy, lower-alkylmercapto, halogen, di-lower-alkylamino, trifluoromethyl, and the like.

Pharmacological evaluation of the compounds of the invention, by the standard photo-cell activity cage procedure using the method of Dews, Brit. J. Pharmacol, 8 46 (1953), has shown that these substances decrease spontaneous activity in mice and indicates usefulness for the compounds as central nervous system depressants.

As used herein, the term "lower-alkyl" means saturated, monovalent hydrocarbon groups including straight and branched-chain groups as illustrated by, but not limited to, methyl, ethyl, propyl, isopropyl, butyl, sec.-butyl, and the like. Lower-alkyl groups of from one to three carbon atoms are preferred.

As used herein, the term "cycloalkyl" means cyclic, saturated hydrocarbon groups as illustrated by, but not limited to, cyclopropyl, cyclobutyl, α-methylcyclobutyl, cyclohexyl, 4-methylcyclohexyl, cyclooctyl, cyclononyl, and the like. Cyclic hydrocarbon groups having from three to eight carbon atoms are preferred.

As used herein, the terms "cycloalkyl-lower-alkyl" and "phenyl-lower-alkyl" mean a monovalent group consisting of cycloalkyl or phenyl, respectively, bonded to the rest of the molecule through a divalent lower-alkylene group as illustrated by, but not limited to, methylene, 1,1-ethylene, 1,2-ethylene, 1,3-propylene, 1,2-propylene, 1,4-butylene, and the like. The divalent lower-alkylene groups preferably have from one to four carbon atoms.

The benzene ring of "phenyl" and "phenyl-lower-alkyl" can bear any number and kind of substituents such as would occur to those skilled in the art. The presence of such substituents on the benzene ring does not adversely affect the pharmacological activity of the compositions of this invention. Among such substituted-benzene rings are, without limiting the generality of the foregoing, lower-alkylphenyl, e.g., methylphenyl, ethylphenyl, isopropylphenyl or any other analogous lower-alkylphenyl group, halophenyl, e.g., chlorophenyl, bromophenyl, iodophenyl or any other analogous halophenyl group, lower-alkoxy phenyl, e.g., methoxyphenyl, ethoxyphenyl, butoxyphenyl or any other analogous lower-alkoxy-phenyl group, trifluoromethylphenyl, lower-alkylthiophenyl, e.g., methylthiophenyl, butylthiophenyl or any other analogous lower-alkylthiophenyl group, N,N-di-lower-alkylamino-phenyl, e.g., N,N-dimethylaminophenyl, N-methyl-N-ethylaminophenyl or any other analogous N,N-di-lower alkylaminophenyl group, or any equivalent substituted phenyl group.

The compounds of the invention are prepared by the following reactions in which R, $R^1$, $R^2$, $R^3$ and $R^4$ have the meanings given above.

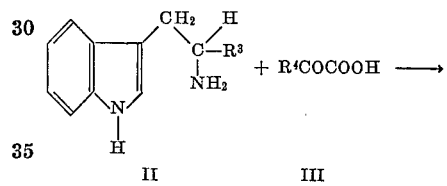

II          III

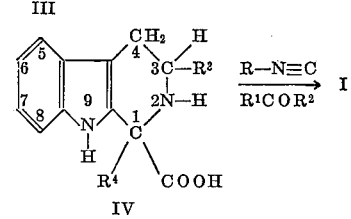

IV

The intermediates of Formula IV are generally known compounds and are prepared by a known procedure. A compound of Formula II is reacted with a α-keto acid of Formula III at a temperature between about 10° C. and about 150° C. in a solvent inert under the conditions of the reaction, for example, water, methanol, ethanol and ethylene glycol to give the compounds of Formula IV. A preferred solvent is water.

The resulting 1 - ($R^4$) - 3 - ($R^3$)-1,2,3,4-tetrahydro-9H-pyrido[3,4-b]indole-1-carboxylic acids of Formula IV are then reacted with an isocyanide in the presence of either an aldehyde or a ketone at a temperature between about 20° C. and about 50° C. to give the 2-(R)-4-($R^1,R^2$)-6-($R^3$)-12b-($R^4$)-1,3-dioxo-1,3,4,6,7,12b - hexahydro - 2H, 12H-pyrazino[1',2':1,2]pyrido[3,4-b]indoles of Formula I hereinabove.

The starting compounds of Formula II are well-known as a class and are prepared by well-known methods, for example by reacting the appropriate indolemagnesium iodide with an appropriate α-($R^3$)-α-phthalimidoacyl chloride followed by hydrolysis of the phthalimido group. The resulting (3-indolyl)-α-amino-α-($R^3$)-methyl ketones are reduced with an alkali metal aluminum hydride to give the starting compound of Formula II.

Alternatively, the starting compounds of Formula II can be prepared by reacting a gramine with an appropriate nitroalkane. The resulting 3 - [2 - nitro-2-($R^3$)-ethyl]

indole on catalytic hydrogenation affords the desired tryptamines.

The 2 - (R) - 4 - (R$^1$,R$^2$) - 6 - (R$^3$) - 12b - (R$^4$) - 1,3-dioxo-1,3,4,6,7,12b-hexahydro - 2H,12H - pyrazino[1',2': 1,2]pyrido[3,4-b]indoles in free base form are weakly basic, and solutions of the acid-addition salts of the bases are conveniently prepared by dissolving the base in an equivalent amount of an aqueous or alcohol solution of an acid. Solutions of the acid-addition salts thus obtained, constitute one form for use of the compounds of the invention. The products of the invention, in the free-base form, can be incorporated in unit dosage form as tablets or capsules for oral administration either alone or in combination with suitable adjuvants such as calcium carbonate, starch, lactose, talc, magnesium stearate, gum acacia, and the like. Still further the compounds can be formulated for oral administration in aqueous alcohol, glycol or oil solutions or oil-water emulsions in the same manner as conventional medicinal substances are prepared.

The structures of the compounds of the invention are established by their mode of synthesis and corroborated by the correspondence between calculated values for the elements and values found by chemical analysis, and by appropriate spectral properties.

INTERMEDIATES

A solution of 40.0 g. (0.43 mole) of glyoxylic acid monohydrate in 40 ml. of water was added to a solution of 30.0 g. (0.187 mole) of tryptamine in a mixture of 75 ml. of glacial acetic acid and 350 ml. of water. The solution was stirred and adjusted to pH 4.0 by the addition of concentrated ammonium hydroxide. A solid separated and after standing at 25° C. for two hours, the solid was suction-filtered, washed with water and dried to give 30 g. of 1,2,3,4-tetrahydro-9H-pyrido[3,4-b]indole - 1 - carboxylic acid, M.P. 216° C. (dec.).

Similar to the procedure described above, there are obtained:

3 - methyl - 1,2,3,4 - tetrahydro - 9H - pyrido[3,4-b] indole - 1 - carboxylic acid from 3 - (2 - aminopropyl) indole and glyoxylic acid monohydrate;

1 - methyl - 3 - ethyl - 1,2,3,4 - tetrahydro - 9H - pyrido [3,4-b]indole - 1 - carboxylic acid from 3 - (2 - aminobutyl)indole and pyruvic acid;

3 - cyclopropyl - 1,2,3,4 - tetrahydro - 9H - pyrido[3,4-b] indole - 1 - carboxylic acid from 3 - (2 - cyclopropyl-2-aminoethyl)indole and glyoxylic acid monohydrate;

1 - cyclohexyl - 1,2,3,4 - tetrahydro - 9H - pyrido[3,4-b] indole - 1 - carboxylic acid from tryptamine and cyclohexanoylformic acid;

3 - cyclohexylmethyl - 1,2,3,4 - tetrahydro - 9H - pyrido [3,4-b]indole - 1 - carboxylic acid from 3 - (3 - cyclohexyl - 2 - aminopropyl)indole and glyoxylic acid monohydrate;

1 - cyclopropylmethyl - 3 - methyl - 1,2,3,4 - tetrahydro-9H-pyrido[3,4-b]indole - 1 - carboxylic acid from 3-(2-aminopropyl)indole and cyclopropylpyruvic acid;

3 - phenyl - 1,2,3,4 - tetrahydro - 9H - pyrido[3,4-b] indole - 1 - carboxylic acid from 3 - (2 - phenyl - 2-aminoethyl)indole and glyoxylic acid monohydrate;

1 - phenyl - 3 - n - propyl - 1,2,3,4 - tetrahydro - 9H-pyrido[3,4-b]indole - 1 - carboxylic acid from 3 - (2-aminopentyl)indole and benzoylformic acid;

1 - methyl - 3 - phenethyl - 1,2,3,4 - tetrahydro - 9H-pyrido[3,4-b]indole - 1 - carboxylic acid from 3 - (4-phenyl - 2 - aminobutyl)indole and pyruvic acid;

1 - benzyl - 1,2,3,4 - tetrahydro - 9H - pyrido[3,4-b]indole-1-carboxylic acid from tryptamine and phenylpyruvic acid;

3,5 - dimethyl - 1,2,3,4 - tetrahydro - 9H - pyrido[3,4-b] indole-1-carboxylic acid from 3 - (2 - aminopropyl)-4-methylindole and glyoxylic acid monohydrate;

3 - cyclopropyl - 5 - chloro - 1,2,3,4 - tetrahydro - 9H - pyrido[3,4-b]indole - 1 - carboxylic acid from 3 - (2-cyclopropyl - 2 - aminoethyl) - 4 - chloroindole and glyoxylic acid monohydrate;

1 - methyl - 3 - ethyl - 6 - methoxy - 1,2,3,4 - tetrahydro-9H-pyrido[3,4-b]indole - 1 - carboxylic acid from 3-(2-aminobutyl)-5-methoxyindole and pyruvic acid;

6,7 - methylenedioxy - 1,2,3,4 - tetrahydro - 9H - pyrido [3,4-b]indole - 1 - carboxylic acid from 5,6 - methylenedioxytryptamine and glyoxylic acid monohydrate;

5 - methylthio - 1,2,3,4 - tetrahydro - 9H - pyrido[3,4-b] indole - 1 - carboxylic acid from 4 - methylthiotryptamine and glyoxylic acid monohydrate;

3 - (4 - chlorophenyl) - 5 - chloro - 1,2,3,4 - tetrahydro-9H - pyrido[3,4-b]indole - 1 - carboxylic acid from 3 - [2 - (4 - chlorophenyl) - 2 - aminoethyl] - 4 - chloroindole and glyoxylic acid monohydrate;

1 - (4 - methylbenzyl) - 6 - dimethylamino - 1,2,3,4-tetrahydro - 9H - pyrido[3,4-b]indole - 1 - carboxylic acid from 5 - dimethylaminotryptamine and 4 - tolylpyruvic acid;

1 - methyl - 3 - ethyl - 6 - benzyloxy - 1,2,3,4-tetrahydro-9H-pyrido[3,4-b]indole - 1 - carboxylic acid from 3-(2-aminobutyl)-5-benzyloxyindole and pyruvic acid;

3 - cyclohexylmethyl - 5 - chloro - 1,2,3,4 - tetrahydro-9H - pyrido[3,4-b]indole - 1 - carboxylic acid from 3 - (3 - cyclohexyl - 2 - aminopropyl) - 4 -chloroindole and glyoxylic acid monohydrate;

3 - phenethyl - 1,5 - dimethyl - 1,2,3,4 - tetrahydro - 9H-pyrido[3,4-b]indole - 1 - carboxylic acid from 3 - (4-phenyl - 2 - aminobutyl) - 4 - methylindole and pyruvic acid;

1 - cyclohexyl - 6 - methyloxy - 1,2,3,4 - tetrahydro - 9H-pyrido[3,4-b]indole - 1 - carboxylic acid from 5-methoxytryptamine and cyclohexanoyl formic acid;

1 - *phenyl* - 3 - n - propyl - 5 - chloro - 1,2,3,4 - tetrahydro - 9H - pyrido[3,4-b]indole - 1 - carboxylic acid from 3 - (2 - aminopentyl) - 4 - chloroindole and benzoylformic acid;

1 - cyclopropylmethyl - 3 - methyl - 6,7 - dimethoxy - 1,2,3,4 - tetrahydro-9H-pyrido[3,4-b]indole - 1 - carboxylic acid from 3-(2-aminopropyl) - 5,6 - dimethoxyindole and cyclopropylpyruvic acid.

The following examples will illustrate the invention without the latter being limited thereto.

EXAMPLE 1

During six hours, a solution consisting of 32.0 g. (0.148 mole) of 1,2,3,4-tetrahydro-9H-pyrido[3,4-b]indole-1-carboxylic acid and 14.7 g. (0.145 mole) of phenyl isocyanide in 500 ml. of dry benzene was stirred and contacted with a stream of nitrogen gas carrying gaseous formaldehyde generated from 30.0 g. of paraformaldehyde. Stirring was continued for sixteen hours under an atmosphere of dry nitrogen gas. The reaction mixture was filtered and the filtrate concentrate in vacuo on a steam bath. Upon recrystallization from boiling ethyl acetate followed by recrystallization from a chloroform-benzene mixture, there was obtained 2-phenyl-1,3-dioxo-1,3,4,6, 7,12b-hexahydro-2H,12H - pyrazino[1',2':1,2]pyrido[3,4-b]indole as pink crystals having a M.P. 183.0–184.8° C. (dec.) (corr.).

Proceeding in a maner similar to that described above in Example 1, there are obtained:

EXAMPLE 2

2,4,6-trimethyl-1,3 - dioxo - 1,3,4,6,7,12b - hexahydro-2H,12H - pyrazino[1',2':1,2]pyrido[3,4 - b]indole by the interaction of 3 - methyl - 1,2,3,4-tetrahydro-9H-pyrido-[3,4-b]indole-1-carboxylic acid, acetaldehyde, and methyl isocyanide.

EXAMPLE 3

2-n-propyl-4,4,12b-trimethyl - 6 - ethyl - 1,3 - dioxo-1,3,4,6,7,12b - hexahydro - 2H,12H - pyrazino[1',2':1,2] pyrido [3,4 - b]indole by the interaction of 1-methyl-3- ethyl-1,2,3,4-tetrahydro-9H-pyrido[3,4-b]indole - 1 - carboxylic acid, acetone, and n-propyl isocyanide.

EXAMPLE 4

2 - cyclohexyl - 4,6 - dimethyl - 4 - ethyl - 1,3 - dioxo - 1,3,4,6,7-12b-hexahydro - 2H,12H - pyrazino[1',2':1,2]pyrido[3,4-b]indole by the interaction of 3-methyl-1,2,3,4-tetrahydro-9Hpyrido[3,4-b]indole - 1 - carboxylic acid, 2-butanone, and cyclohexyl isocyanide.

EXAMPLE 5

2 - cyclopropylmethyl - 4 - phenyl - 6 - cyclopropyl-1,3-dioxo - 1,3,4,6,7,12b - hexahydro - 2H,12H - pyrazino-[1',2':1,2]pyrido[3,4-b]indole by interaction of 3-cyclopropyl - 1,2,3,4 - tetrahydro - 9H - pyrido[3,4-b]indole-1-carboxylic acid, benzaldehyde, and cyclopropylmethyl isocyanide.

EXAMPLE 6

2-phenyl-4,4 - dibenzyl - 1,3 - dioxo - 1,3,4,6,7,12b-hexahydro - 2H,12H - pyrazino[1',2':1,2]pyrido[3,4-b]indole by the interaction of 1,2,3,4-tetrahydro-9H-pyrido-[3,4-b]indole-1-carboxylic acid, 1,3-diphenyl acetone, and phenyl isocyanide.

EXAMPLE 7

2 - benzyl - 4 - cyclopropyl - 4 - methyl - 6 - phenyl-1,3-dioxo-1,3,4,6,7,12b - hexahydro - 2H,12H - pyrazino-[1',2':1,2]pyrido[3,4-b]indole by the interaction of 3-phenyl-1,2,3,4 - tetrahydro - 9H - pyrido[3,4-b]indole-1-carboxylic acid, methyl cyclopropyl ketone, and benzyl isocianide.

EXAMPLE 8

2-n-butyl-4,4-diphenyl - 12b - cyclohexyl - 1,3 - dioxo-1,3,4,6,7,12b - hexahydro - 2H,12H - pyrazino[1',2':1,2] pyrido[3,4-b]indole by the interaction of 1-cyclohexyl-1,2,3,4 - tetrahydro-9H-pyrido[3,4-b]indole-1-carboxylic acid, benzophenone, and n-butyl isocyanide.

EXAMPLE 9

2-cyclohexyl-4-ethyl-4-n-propyl - 6 - cyclohexylmethyl-1,3-dioxo-1,3,4,6,7,12b - hexahydro - 2H,12H - pyrazino-[1',2':1,2]pyrido[3,4-b]indole by the interaction of 3-cyclohexylmethyl-1,2,3,4-tetrahydro - 9H - pyrido[3,4-b] indole-1-carboxylic acid, 3-hexanone, and cyclohexyl isocyanide.

EXAMPLE 10

2-phenethyl-4-i-propyl-4-cyclohexyl - 6 - methyl - 12b-cyclopropylmethyl-1,3-dioxo - 1,3,4,6,7,12b - hexahydro-2H,12H - pyrazino[1',2':1,2]pyrido[3,4-b]indole by the interaction of 1-cyclopropylmethyl-3-methyl-1,2,3,4-tetrahydro-9H-pyrido[3,4-b]indole-1-carboxylic acid, cyclohexyl i-propyl ketone, and phenethyl isocyanide.

EXAMPLE 11

2-t-butyl-4,4-bis(cyclohexylmethyl)-6 - n - propyl-12b-phenyl-1,3-dioxo - 1,3,4,6,7,12b - hexahydro - 2H,12H-pyrazino[1',2':1,2]pyrido[3,4-b]indole by the interaction of 1-phenyl-3-n-propyl-1,2,3,4-tetrahydro - 9H - pyrido-[3,4-b]indole-1-carboxylic acid, 1,3-dicyclohexyl acetone, and t-butyl isocyanide.

EXAMPLE 12

2,4-diphenyl-4-cyclobutyl - 6 - phenethyl - 12b - methyl-1,3-dioxo-1,3,4,6,7,12b-hexahydro - 2H,12H - pyrazino-[1',2':1,2]pyrido[3,4-b]indole by the interaction of 1-methyl-3-phenethyl - 1,2,3,4 - tetrahydro-9H-pyrido[3,4-b]indole-1-carboxlic acid, cyclobutyl phenyl ketone, and phenyl isocyanide.

EXAMPLE 13

2-ethyl-4-cyclopropylmethyl - 4 - phenyl - 12b - benzyl-1,3-dioxo-1,3,4,6,7,12b-hexahydro - 2H,12H - pyrazino-[1',2':1,2]pyrido[3,4-b]indole by the interaction of 1-benzyl-1,2,3,4-tetrahydro - 9H - pyrido[3,4-b]indole - 1-carboxylic acid, cyclopropylmethyl phenyl ketone, and ethyl isocyanide.

When the appropriate 1-($R^4$)-3-($R^3$)-1,2,3,4-tetrahydro-9H-pyrido[3,4-b]indole-1-carboxylic acid, bearing one or more substituents in the positions available for substitution in the benzenoid moiety fused to the pyrrole ring, and the appropriate isocyanide, and the appropriate carbonyl compound are interacted in a manner similar to that described in Example 1, there are obtained:

2,6,8-trimethyl-1,3-dioxo-1,3,4,6,7,12b-hexahydro-2H-12H-pyrazino[1',2':1,2]pyrido[3,4-b]indole from the interaction of 3,5-dimethyl-1,2,3,4-tetrahydro-9H-pyrido[3,4-b]indole-1-carboxylic acid, formaldehyde, and methyl isocyanide;

2-phenyl-6-cyclopropyl-8-chloro-1,3-dioxo-1,3,4,6,7,12b-hexahydro-2H,12H-pyrazino[1',2':1,2]pyrido[3,4-b]indole from the interaction of 3-cyclopropyl-5-chloro-1,2,3,4-tetrahydro-9H-pyrido[3,4-b]indole-1-carboxylic acid, formaldehyde and phenyl isocyanide;

2-n-propyl-4,4,12b-trimethyl-6-ethyl-9-methoxy-1,3-dioxo-1,3,4,6,7,12b-hexahydro-2H,12H-pyrazino-[1',2':1,2]pyrido[3,4-b]indole from the interaction of 1-methyl-3-ethyl-6-methoxy-1,2,3,4,-tetrahydro-9H-pyrido[3,4-b]indole-1-carboxylic acid, acetone, and n-propyl isocyanide;

2-cyclopropylmethyl-9,10-methylenedioxy-1,3-dioxo-1,3,4,6,7,12b-hexahydro-2H,12H-pyrazino[1',2':1,2]pyrido[3,4-b]indole from the interaction of 6,7-methylenedioxy-1,2,3,4-tetrahydro-9H-pyrido-[3,4-b]indole-1-carboxylic acid, formaldehyde and cyclopropylmethyl isocyanide;

2-benzyl-4-ethyl-4-methyl-8-methylthio-1,3-dioxo-1,3,4,6,7,12b-hexahydro-2H,12H-pyrazino[1',2':1,2]pyrido[3,4-b]indole from the interaction of 5-methylthio-1,2,3,4-tetrahydro-9H-pyrido[3,4-b]indole-1-carboxylic acid, 2-butanone, and benzyl isocyanide;

2-cyclohexyl-4-ethyl-4-n-propyl-6(4-chlorophenyl)-8-chloro-1,3-dioxo-1,3,4,6,7,12b-hexahydro-2H,12H-pyrazino[1',2':1,2]pyrido[3,4-b]indole from the interaction of 3-(4-chlorophenyl)-5-chloro-1,2,3,4-tetrahydro-9H-pyrido[3,4-b]indole-1-carboxylic acid, 3-hexanone, and cyclohexyl isocyanide;

2-n-butyl-4-cyclopropyl-4-methyl-12b-(4-methylbenzyl)-9-dimethylamino-1,3-dioxo-1,3,4,6,7,12b-hexahydro-2H,12H-pyrazino[1',2':1,2]pyrido-[3,4-b]indole from the interaction of 1-(4-methylbenzyl)-6-dimethylamino-1,2,3,4-tetrahydro-9H-pyrido[3,4-b]indole-1-carboxylic acid, methyl cyclopropyl ketone, and n-butyl isocyanide;

2,12b-dimethyl-4,4-bis(cyclohexylmethyl)-6-ethyl-9-benzyloxy-1,3-dioxo-1,3,4,6,7,12b-hexahydro-2H,12H-pyrazino[1',2:1,2]pyrido[3,4-b]indole from the interaction of 1-methyl-3-ethyl-6-benzyloxy-1,2,3,4-tetrahydro-9H-pyrido[3,4-b]indole-1-carboxylic acid, 1,3-dicyclohexyl acetone, and methyl isocyanide;

2-t-butyl-4,4-diphenyl-6-cyclohexylmethyl-8-chloro-1,3-dioxo-1,3,4,6,7,12b-hexahydro-2H-12H-pyrazino-[1',2':1,2]pyrido[3,4-b]indole from the interaction of 3-cyclohexylmethyl-5-chloro-1,2,3,4-tetrahydro-9H-pyrido[3,4-b]indole-1-carboxylic acid, benzophenone, and t-butyl isocyanide;

2-cyclopropylmethyl-4-cyclopropyl-4,8,12b-trimethyl-6-phenethyl-1,3-dioxo-1,3,4,6,7,12b-hexahydro-2H,12H-pyrazino[1',2':1,2]pyrido[3,4-b]indole from the interaction of 3-phenethyl-1,5-dimethyl-1,2,3,4-tetrahydro-9H-pyrido[3,4-b]indole-1-carboxylic acid, methyl cyclopropyl ketone and cyclopropylmethyl isocyanide;

2-(4-chlorophenyl)-4,4-bis benzyl-12b-cyclohexyl-9-methoxy-1,3-dioxo-1,3,4,6,7,12b-hexahydro-2H,12H-pyrazino[1',2':1,2]pyrido[3,4-b]indole from the interaction of 1-cyclohexyl-6-methoxy-1,2,3,4-tetrahydro-9H-pyrido[3,4-b]indole-1-carboxylic acid, 1,3-diphenyl acetone, and 4-chlorophenyl isocyanide;

2-(4-methoxyphenyl)-4-(4-dimethylaminophenyl)-6-n-propyl-12b-phenyl-8-chloro-1,3-dioxo-1,3,4,6,7,12b-hexahydro-2H,12H-pyrazino[1',2':1,2]pyrido[3,4-b]indole from the interaction of 1-phenyl-3-n-propyl-5-chloro-1,2,3,4-tetrahydro-9H-pyrido[3,4-b]indole-1-carboxylic acid, 4-dimethylaminobenzaldehyde, and 4-methoxyphenyl isocyanide;

2-(4-methylthiophenyl)-4-(4-chlorophenyl)-4-ethyl-6-methyl-12b-cyclopropylmethyl-9,10-dimethoxy-1,3-dioxo-1,3,4,6,7,12b-hexahydro-2H,12H-pyrazino[1',2':1,2]pyrido[3,4-b]indole from the interaction of 1-cyclopropylmethyl-3-methyl-6,7-dimethoxy-1,2,3,4-tetrahydro-9H-pyrido[3,4-b]indole-1-carboxylic acid, ethyl 4-chlorophenyl ketone, and 4-methylthiophenyl isocyanide;

2-(2-methoxyphenyl)-6-methyl-9,10-dimethoxy-12b-cyclopropylmethyl-1,3-dioxo-1,3,4,6,7,12b-hexahydro2H,12H-pyrazino[1',2':1,2]pyrido[3,4-b]indole from the interaction of 1-cyclopropylmethyl-3-methyl-6,7-dimethoxy-1,2,3,4-tetrahydro-9H-pyrido[3,4-b]indole-1-carboxylic acid, formaldehyde, and 2-methoxyphenyl isocyanide.

I claim:
1. 2-(R)-4-($R^1$,$R^2$)-6-($R^3$) - 12b - ($R^4$) - 1,3 - dioxo-1,3,4,6,7,12b-hexahydro - 2H,12H - pyrazino[1',2':1,2]pyrido[3,4-b]indole of the formula

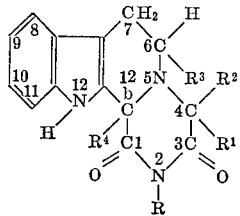

wherein R is lower-alkyl, cycloalkyl, cycloalkyl-lower-alkyl, phenyl or phenyl-lower-alkyl, and each of $R^1$, $R^2$, $R^3$ and $R^4$ is hydrogen, n-lower-alkyl of from one to three carbon atoms, cycloalkyl, cycloalkyl-lower-alkyl, phenyl or phenyl-lower-alkyl.

2. 2 - phenyl - 1,3 - dioxo - 1,3,4,6,7,12b-hexahydro-2H,12H-pyrazino[1',2':1,2]pyrido[3,4-b]indole, according to claim 1, wherein R is phenyl and $R^1$, $R^2$, $R^3$ and $R^4$ are hydrogen.

3. The process for preparing 2-(R)-4-($R^1$,$R^2$)-6-($R^3$)-12b-($R^4$)-1,3-dioxo - 1,3,4,6,7,12b - hexahydro - 2H,12H-pyrazino[1',2':1,2]pyrido[3,4 - b]indole, according to claim 1, which comprises reacting a compound of the formula

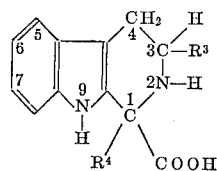

with an isonitrile of the formula R—N≡C and a carbonyl compound of the formula $R^1$—CO—$R^2$.

References Cited
UNITED STATES PATENTS 3,026,321  3/1962  De Jongh _____ 260—268
3,151,116  9/1964  De Stevens _____ 260—268

ALEX MAZEL, Primary Examiner
D. G. DAUS, Assistant Examiner

U.S. Cl. X.R.
260—295, 326.15, 464, 465, 465.1, 519, 526, 593, 599, 601, 644, 689, 999

UNITED STATES PATENT OFFICE
CERTIFICATE OF CORRECTION

Patent No. 3,468,890          Dated September 23, 1969

Inventor(s) Sydney Archer

It is certified that error appears in the above-identified patent and that said Letters Patent are hereby corrected as shown below:

Column 1, lines 29-35, in formula I,

" 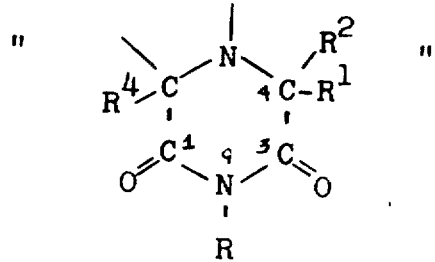 "   should read   -- 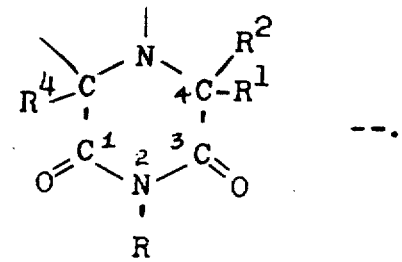 --.

Column 5, line 31, "isocianide" should read --isocyanide--.

SIGNED AND SEALED
AUG 25 1970

(SEAL)
Attest:

Edward M. Fletcher, Jr.
Attesting Officer

WILLIAM E. SCHUYLER, JR.
Commissioner of Patents